H. SIMMONS.
SHIELD.
APPLICATION FILED FEB. 9, 1921.

1,399,446.  Patented Dec. 6, 1921.

Inventor
Harry Simmons
By Herbert E. Smith
Attorney

UNITED STATES PATENT OFFICE.

HARRY SIMMONS, OF SPOKANE, WASHINGTON.

SHIELD.

REISSUED

1,399,446.    Specification of Letters Patent.    Patented Dec. 6, 1921.

Application filed February 9, 1921. Serial No. 443,684.

*To all whom it may concern:*

Be it known that I, HARRY SIMMONS, a citizen of the United States, residing at Spokane, in Spokane county and State of Washington, have invented certain new and useful Improvements in Shields, of which the following is a specification.

My present invention relates to an improved shield for automobiles and similar vehicles to be used in conjunction with the usual transparent wind shields, as an additional protection against rain, snow, or other prevailing weather conditions that would interfere with the transparency of the usual windshield and prevent clear vision therethrough.

The primary object of the invention is the provision of an auxiliary shield or shade that may readily be attached to the front or forward end of the automobile top or cover, and located in such position with relation to the well known form of transparent or glass windshield as to be available for use not only as a shield or protector for the glass when required, but also as an opaque shade against reflected light to insure perfect vision of the driver.

To this end the invention consists in certain novel combinations and arrangements of parts embodied in a counterbalanced and adjustable shield located in convenient and accessible position for the driver, which may be manipulated with facility, is durable, and is a comparatively perfect device for performing its required functions.

In the accompanying drawings I have illustrated one complete example of the physical embodiment of my invention in which the parts are combined and arranged according to the best mode I have thus far devised for the practical application of the principles of my invention.

Figure 1:
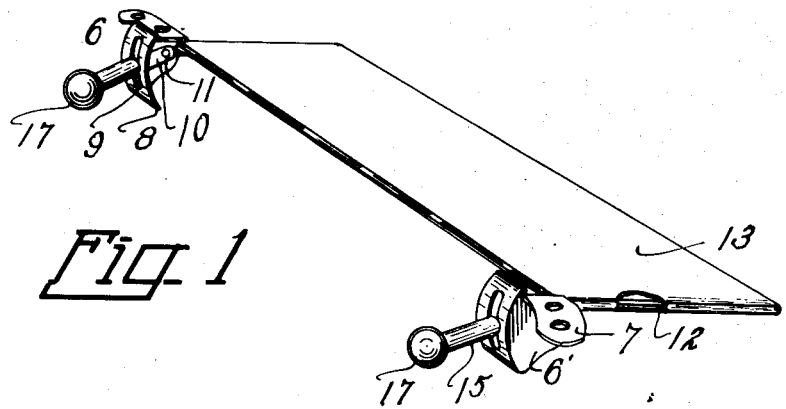
Figure 1 is a perspective view of the shield embodying my invention, ready for attachment to an automobile.
Figure 2:
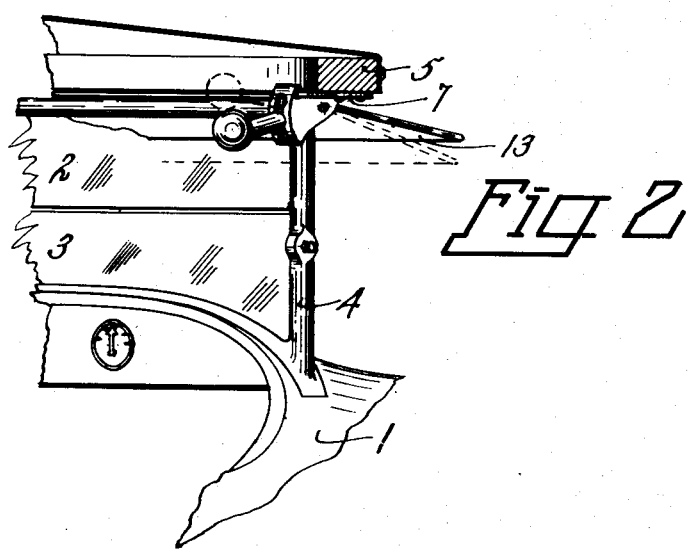
Fig. 2 is a perspective view, partly in section showing so much of an automobile as is necessary to illustrate the application thereto of the device of my invention.

In order that the general assembly and relation of parts may be readily understood I have illustrated a portion of an automobile as 1 in Fig. 2, wherein are also shown the usual adjustable upper and lower transparent windshields 2 and 3, and the windshield post 4. The device of the invention may be separately attached to the frame bar 5 of the cover or top of the automobile and it will be apparent that automobiles may be equipped with my device as an auxiliary or accessory for use in connection with the usual windshields of the automobile, as shown in Fig. 2.

The shield or shade of the invention it attached to the bar 5, by means of a pair of complementary brackets 6 and 6′ each provided with a horizontal, perforated flange 7, and these brackets are attached at the underside of the bar 5 at the ends of this bar adjacent to the windshield posts 4. The brackets are of metal and each is fashioned with a curved or circular flange 8 located at the rear of the bracket and extending inwardly or toward the longitudinal axis of the automobile, and as shown in the drawings the curved or arcuate flange of each bracket is provided with a slot 9.

Within each bracket is pivoted a flat metallic plate 10 forming an angular head with its pivot at 11 in the vertical wall of the bracket, and each head is fashioned with a forwardly projecting angle arm 12 having a series of perforations therein for securing the edges of the shield 13. The shield is rectangular in form and composed of fairly stiff board as a filler between coverings which may be of weather proof material and polished or finished to provide an attractive appearance, and the shield thus formed furnishes an opaque, rigid, light, but strong body of which the two spaced arms 12 form a part. The shield projects from under the transverse top-frame bar 5 a suitable distance ahead of the automobile to perform its functions as a protector for the glass windshields 2 and 3, and is adjustable on its pivotal supports 11 from a horizontal position to angles of different degrees for various purposes.

Figure 3:
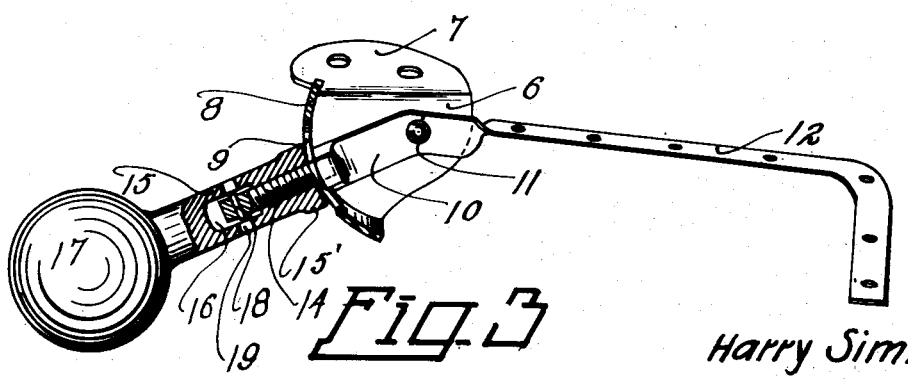
Fig. 3 is an enlarged, detail view, partly in section, of part of the device.

At the rear, each of the heads 10 is provided with a threaded stud 14, located and adapted to swing through the slot 9 of the bracket, and by means of the threaded sleeve 15 whose head 15′ is adapted to bear against the arcuate flange 8 of the bracket, the head 10 may be clamped in position. The sleeve is interiorly threaded to act as a clamping nut on the threaded stud, and in addition to the threaded bore, an enlargement or pocket 16 is provided in the sleeve, as best seen in Fig. 3.

Each tubular member or sleeve is fashioned with a spherical knob 17 which is of sufficient size and weight to counter-balance the weight of the shield or shade 13 at the opposite side of the pivotal supports 11 therefor.

A tapered pin 18 is passed transversely through an opening in the end of the stud 14, with its ends projecting out into the pocket 16, to allow free movement of the threaded sleeve on the stud, but prevent the sleeve from becoming displaced or lost from the stud, due to vibration of the traveling car. To permit ready insertion of the retaining pin in the stud, I provide a pair of opposed and alined, transverse openings 19 through the sleeve, and the pin may be inserted through one opening, and driven out, if required by a tool inserted in the opening. By tapping on the tool the pin may be dislodged, and then the sleeve is free to be turned entirely off the stud, if desired.

From the above description taken in connection with my drawings it is believed the utility and manipulation of the device will be evident. The two knobs 17 are within easy reach of both hands of the driver of the car, who may grasp them, turn the knobs to release the clamp heads 15' from frictional contact with the arcuate sleeve, swing the knobs either up or down to adjust the position of the shade on its pivotal supports 11, and then by turning the knobs to the right the sleeves are clamped against the arcuate flange to hold the shade in adjusted position. The counterbalancing weights 17 render the movement of the shade easy, and as these weights are simultaneously adjustable the shade is held with stability and prevented from warping.

Having thus fully described my invention, what I claim as new and desire to secure by Letters Patent is—

1. The combination with a pair of spaced brackets, of a head pivoted in each bracket, arms on said heads and a shield on said arms, a slotted flange on one of said brackets, a threaded stud on a head movable in said slotted flange, a clamp member on said threaded stud adapted to engage said flange, and a counterweight on said clamp member.

2. The combination with a pair of spaced brackets, of a shield having heads pivoted therein, an arcuate, slotted flange on one bracket, a threaded stud on a head passing through said slotted flange, a threaded sleeve on the stud adapted to frictionally engage the flange, and a counter-balancing weight on said sleeve.

3. The combination in a device as described with a supporting bracket having an arcuate, slotted flange, of a head pivoted in the slot and formed with a threaded stud extension passed through the slotted flange, a sleeve threaded on the stud and having a head to frictionally engage the flange, and a weight carried by said sleeve for the purpose described.

4. The combination with a pair of brackets each having an arcuate, slotted flange, of a shield having spaced arms, heads on said arms pivotally supported in said brackets, threaded studs on said heads passed through said slotted flanges, a sleeve threaded on each stud and adapted to frictionally engage a slotted flange, and a weight carried by each sleeve.

In testimony whereof I affix my signature.

HARRY SIMMONS.